United States Patent [19]

Cervin

[11] 4,042,993

[45] Aug. 23, 1977

[54] POULTRY SHACKLE SCRUBBER

[76] Inventor: Curtis M. Cervin, 5253 Xerxes Ave. South, Minneapolis, Minn. 55410

[21] Appl. No.: 729,808

[22] Filed: Oct. 5, 1976

[51] Int. Cl.² .................. B65G 45/00; A46B 13/02
[52] U.S. Cl. ............................. 15/21 D; 198/496
[58] Field of Search ............. 15/21 C, 21 D, 21 E, 15/77, 88, 97, 102; 51/23, 80 R, 111 R; 134/6; 198/496

[56] References Cited

U.S. PATENT DOCUMENTS

| | | | |
|---|---|---|---|
| 3,284,828 | 11/1966 | Jennings et al. | 15/21 D |
| 3,314,819 | 4/1967 | Dyer | 15/21 D X |
| 3,806,979 | 4/1974 | Bonami | 15/21 E X |
| 3,858,715 | 1/1975 | Brock et al. | 15/21 D X |

*Primary Examiner*—Edward L. Roberts

*Attorney, Agent, or Firm*—Schroeder, Siegfried, Ryan & Vidas

[57] ABSTRACT

A scrubbing mechanism is disclosed that is constructed and arranged for use with an overhead poultry or animal shackle conveying mechanism having a vertical hoisting mechanism with a bifurcated platform operable to a selectable vertical position that is secured to, and supported by a bifurcated frame at an inclined angle to permit such shackles to pass therebetween. The bifurcated frame supports a pair of brushes with abrasive bristles rotating in opposite directions and disposed in a parallel manner to provide a downward pulling engagement of at least one of the overhead shackles therebetween while a plurality of conduits dispense a selected liquid, the selection of which, and amount to be intermittently dispensed, is controlled by a selectable control mechanism connected to a liquid dispensing mechanism which is connected to the conduits and a plurality of liquids.

10 Claims, 4 Drawing Figures

POULTRY SHACKLE SCRUBBER

This invention relates to the field of cleaning equipment and more particularly to a mechanism for scrubbing the shackles which are used to hold poultry or animals in a slaughtering and packing operation.

One of the prime problems which accompanies a slaughterhouse is in keeping the equipment in a sanitary condition. Portions of the equipment, particularly conveying mechanisms which transport the poultry or animals through the slaughtering and packing areas, constantly are subjected to splattering blood and other animal or poultry tissues, including feathers and hair, which adhere to the shackles because of their construction.

The general practice of cleaning the shackles has been to hand brush the shackles with chemicals and brushes in an attempt to remove the collection of foreign materials. In fact, the shackles themselves are generally formed of metal which does not have an extremely smooth surface and thus the problem is made more difficult in attempting to keep the foreign matter from adhering to the shackles. Other forms of cleaning the shackles include the use of hand foaming and rinsing of the shackles, as well as spray booth foaming and rinsing of the shackles or just plain dipping the shackles in a caustic solution which is heated generally through a stream boiler. All of the above results have proved to be inadequate, particularly because they do not do anything to improve the smoothness of the surfaces of the various shackles and thus the foreign materials such as just described adhere to the shackle surfaces.

The present invention deals with the problem of not only getting the shackles clean, but also scrubbing the shackles and polishing the shackles so that the longer they are used with the present invention, the less tendency there is for foreign particles and matter to adhere to the shackles themselves. Thus the shackles are not only cleaned, but they are polished so that there is less likelihood in the future to create an additional health problem. By intermittently controlling the cleaning solutions which are used with abrasive brushes, the shackles are not only cleaned but polished and thus become easier to clean each time they pass through the equipment. The present invention also is designed to be brought to the shackles on the conveying mechanism and brought into engagement with the shackles regardless of their height from the floor and their construction so that the scrubbing operation may be completed in one pass of a shackle through the machine.

It is therefore a general object of the present invention to provide an improved machine for scrubbing shackles used with poultry and animals in a slaughter and packing house.

It is a more specific object of this invention to provide a scrubbing and cleaning mechanism that is portable and adaptable to the structure and arrangement of the conveying mechanism in a slaughter house.

It is still a further object of this invention to provide a scrubbing and cleaning mechanism that dispenses and controls intermittently, a plurality of liquids for cleaning and rinsing.

It is yet another object of this invention to provide a cleaning mechanism that is capable of cleaning the under surfaces of such shackles.

These and other objects and advantages of the invention will more fully appear from the following description, made in connection with the accompanying drawings, wherein like reference characters refer to the same or similar parts through out the several views, and in which.

Figures 1, 2, 4:
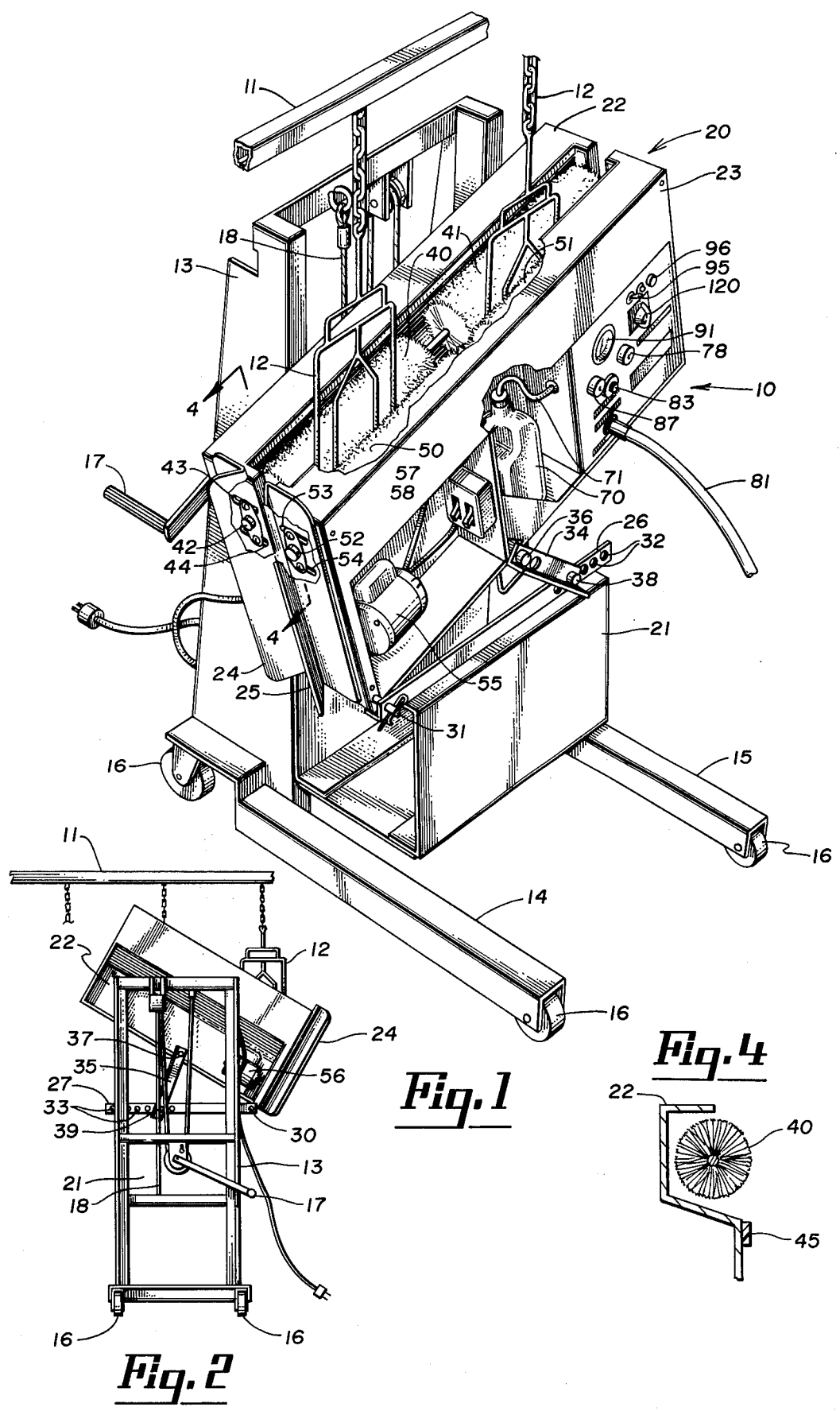
FIG. 1 is a perspective view of the shackle scrubber as seen from the left front of the mechanism.
FIG. 2 is a back elevation of the shackle scrubber.
FIG. 4 is a section taken along lines 4—4 of FIG. 3.

In the development of the present invention, various aspects of attempting to scrub or polish the shackle were attempted and discarded. Initially, nylon brushes were used with no success in attempting to clean the shackles. Even where strong cleaning compounds or solutions were used, the shackles continued to remain covered with foreign matter.

Circular brushes were first used which has an 8 inch diameter and it has been found that an optimum diameter is approximately 10 inches at the present time. In attempting to get more scrubbing action, pads of Scotch Brite ® material were used but it was discovered that they got caught in the shackle members and were literally torn apart. The Scotch Brite pads were used in cooperation with the nylon bristles. An abrasive material was then used in the nylon bristles to improve the polishing qualities of the brushes. However, dispensing the proper solution in the proper interval required alternate solutions of a liquid acid, alkali, or other such material in order to produce not only a clean shackle but one that was scrubbed and polished so that additional foreign material would not stick to it.

Referring now to the drawings, there is disclosed a shackle scrubber 10 which is located beneath an overhead conveyor 11 which carries a plurality of shackles 12 that are vertically suspended from conveyor 11. That is, conveyor 11 is an overhead type conveyor which has chains or other flexible elements extending downwardly which hold the shackles that are used to hold the poultry or animals while passing through the various stages of slaughtering and packing.

Scrubbing mechanism 10 is supported by a vertical hoisting mechanism 13 which has a base member formed from a pair of legs 14 and 15 to which there are pivotally secured a plurality of wheels 16. The rear wheels are also supported about a vertical axis so that the base member may be readily maneuverable. If it is desired, a lock mechanism (not shown) may be engaged to secure the vertical hoisting mechanism 13 against movement with respect to the floor. A hand crank 17 and a cable 18 supply the appropriate lift mechanism to a platform 21 which is secured thereto and is generally of U-shaped cross section. The platform 21 is made up of plates forming the two sides and bottom to give additional strength and rigidity to platform 21.

An elongated bifurcated frame 20 is formed of a pair of elongated box-like frame elements 22 and 23. Secured to the end of the elongated frame elements 22 and 23 are a pair of shackle guide members 24 and 25 respectively, that are secured on the end which first encounters the shackles 12 as they move with the conveyor mechanism 11. Elongated frame members 22 and 23 have supporting elements across the top thereof and open sides in which the components of the shackle scrubber are contained.

A pair of right angle channel members 26 and 27 are secured to the upper portions of platform 21. A pair of pivotal pin members 30 and 31 are used to pivotally secure elongated frame elements 22 and 23 to channel members 27 and 26 respectively at the forward or leading edge of frame members 22 and 23.

A plurality of bores 32 and 33 are formed in channel members 26 and 27 respectively at their ends opposite pivots 31 and 30. A pair of arms 34 and 35 are secured to the lower edge portions of elongated frames 22 and 23 by suitable means such as pins 36 and 37 and another pair of pins 38 and 39 are secured in one of the bores 32 and 33 to provide the bifurcated frame 21 at an appropriate slant or angle with respect to platform 21. The reason for the tilting or slanting angle of the bifurcated frame 21 will become apparent upon further description of the invention.

Disclosed near the top of elongated frame 22 is a pair of brushes 40 and 41 which have a shaft extending longitudinally therethrough and substantially parallel to the frame member 22. The ends of the shaft are secured in a pair of bearing journals 42 which have releasable means such as machine bolts securing the journal to the end of frame member 22 through a pair of slots 43 and 44. Disposed beneath brushes 40 and 41 is a guide bar 45 (FIG. 4) which extends longitudinally and substantially parallel to the axis of brushes 40 and 41. Guide bar 45 is formed of a polyvinyl chloride plastic and is approximately 1.5 inches high and 1.25 inches thick.

In a similar manner, another pair of brushes 50 and 51 are rotated through the use of a common shaft which is journaled through a pair of bearing journals 52 at the ends of frame members 23 where the bearing journal is secured to the frame elements by suitable means such as machine bolts through a pair of slots 53 and 54 which also provide a transverse alignment of brushes 50 and 51 with respect to brushes 40 and 41. It has been found that where the brush core is made of a polyvinyl chloride plastic which contains a carbide silicon tynex compound, the best results have been obtained. It has also been determined that a 10 inch diameter is much preferable to a smaller diameter which was found to be unsuccessful previously. One such manufacturer of the brush is that of CSH Industries, Inc., Chicago, Ill. 60609, which produces such a brush of 10 inch diameter and approximately 20 inches long in each section, the model number being DC-25-180SC. The bristles or core material of the brush are also secured in place with stainless steel wire so that the entire brush is inert to chemical compositions used in the cleaning solutions. Another guide bar like guide bar 45 is used with brushes 50 and 51.

Where the brushes which are of equal diameter are mounted so that the bristles of one brush overlap the bristles of another brush by approximately ½ inch, the proper scrubbing action is obtained for most shackles. That is, the shafts would have centers which are displaced by approximately 9½ inches. It has also been found that the optimum speed of the brushes for producing the best cleaning and scrubbing action is approximately 300 rpm which is accomplished through the use of a pair of motors 55 and 56. Motor 55 is a reversible motor and is controlled through a main power switch 57 and a reversing switch 58. Motors 56 and 55 are energizable through a 120 volt source and a pair of electrical conductors 60 and 61. Motor 55 has another reversing and winding which is connected to switch 58 through an electrical conductor 62 and may be of the type manufactured by the Dayton Motor Company 5K453. The speed of the brushes is controlled through a pair of chain speed reducers using a pair of smaller sprockets 63 which are connected to the motor and which in turn drive a pair of larger sprockets 64 through a chain 65.

Figure 3:
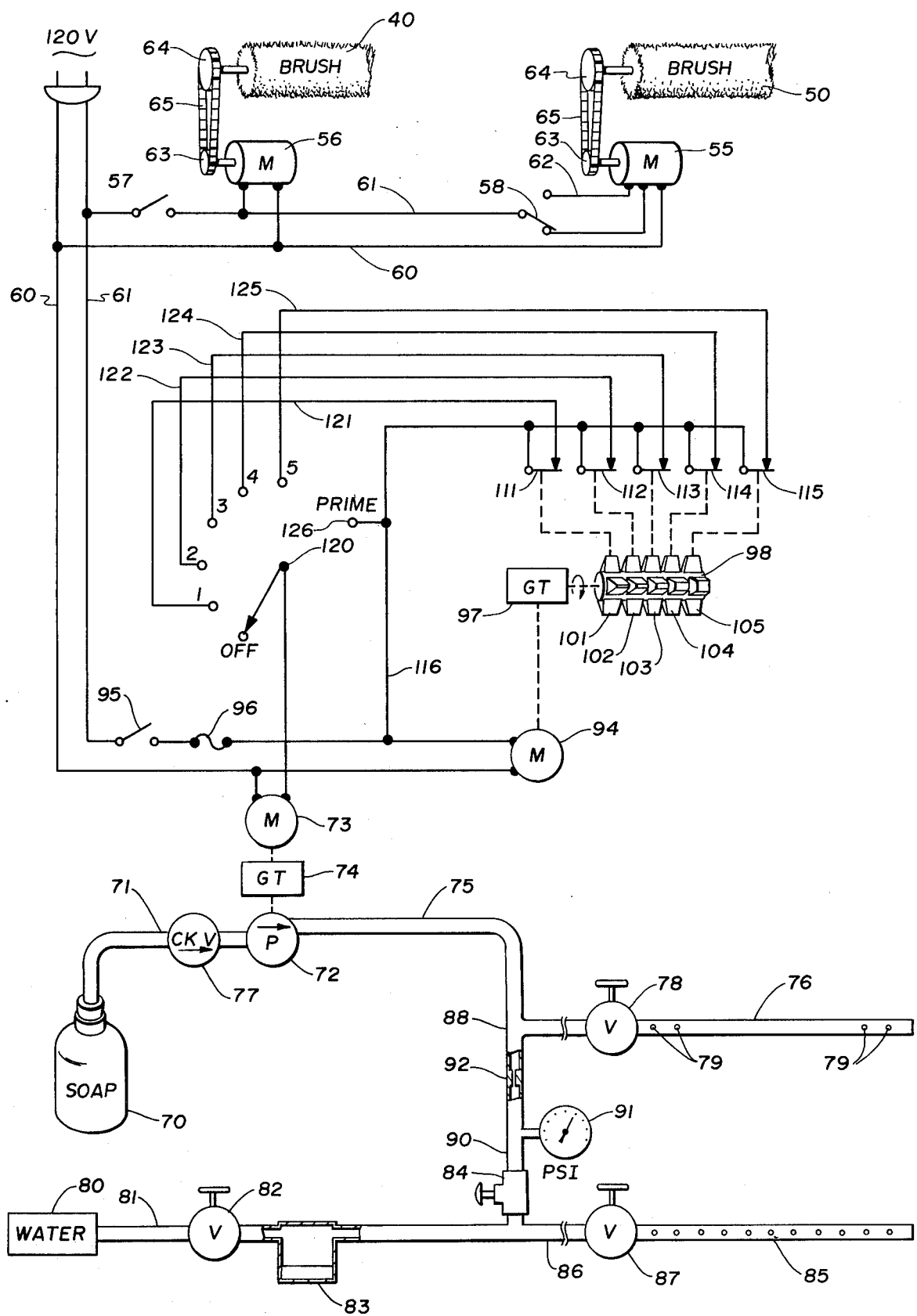
FIG. 3 is a schematic of the hydraulic and electrical circuit of the shackle scrubber.

As shown in FIG. 3, a soap or solvent container 70 supplies its contents through a flexible conduit 71 and a check valve 77 to a pump 72. Pump 72 is a pump manufactured by Roll-Flex Industries, Inc. which has a maximum output pressure of 21 psi, and is designated Model 50-R-2N. Pump 72 is driven by a motor 73 through a gear reducer 74. Motor 73 is of the typical shaded pole type and the gear reducer 74 and motor are manufactured by Grainger Gear Motor Company, Model No. 22812 producing an output speed of approximately 200 rpm. Pump 72 has another conduit 75 connected to its output which is also connected to a soap output conduit 76 through a throttle valve 78. Soap output conduit 76 has four holes 79 formed therein of 0.080 inch diameter to provide the soap solution to brushes 50 and 51.

A source of water 80 under pressure is applied to the hydraulic system through a conduit 81 and a throttle valve 82. Throttle valve 82 is connected to a strainer 83 which is connected to a rinse output conduit 85 through a conduit 86 and a throttle valve 87. Conduit 85 has 11 holes formed therein of 0.062 inch diameter. Connected between conduit 75 and conduit 86 is a connecting conduit 90 which has a pressure regulator 84 and a pressure indicator 91 connected thereto with a restrictor 92 formed in the conduit to provide a restricted water flow toward throttle valve 78. That is, a restricted flow of water comes through restrictor 92 and is joined with the soap solution from pump 72 where it is mixed in a mixing chamber 88 and dispensed through output conduit 76. The soap solution enters the mixing chamber 88 at about 4 psi and is mixed with water entering at about 4 psi. Thus the dispensing mechanism is in the form of motor 73, gear train 74, and pump 72, supplying soap to the output conduit as long as the pump is being driven. When the pump is not being driven, water is prevented from entering the soap line through check valve 77 and may pass through either of the output conduits 76 or 75, depending upon the condition of throttle valves 78 and 87.

A control mechanism for controlling the action of the liquid dispenser is in the nature of a motor 94 connected to electrical conductors 60 and 61 through a switch 95 and a fuse 96. Thus, motor 94 operates continuously when switch 95 is closed and in turn drives a gear train 97 which is connected to a rotatable block of cams 98 which are formed in 5 sections, 101, 102, 103, 104, and 105. Each section has four lobes in which the cams are identical and are disposed at 90° from each other circumferentially. The frontal lobe area of each cam is distinct from the other in that cam 101 has the smallest frontal area and cam 105 has the largest frontal area with each of those between being proportionally larger. Thus when engaged, the lobes having the greater frontal area will cause a greater contact time to elapse. Thus, 5 switches, 111, 112, 113, 114, and 115 are each controlled respectively by the cams in sections 101 through 105 and thus switch 115 is closed considerably longer than switch 111 as just described. The armature terminal of each of switches 111 through 115 is connected to line 61 through switch 95 and fuse 96 by an electrical conductor 116.

A selector switch 120 has its wiper arm connected to motor 73 and the other terminal of motor 73 is connected to electrical conductor 60. The other terminal of switch 111 is connected to terminal 1 of selector switch 120 through a conductor 121, the other terminal of switch 112 is connected to terminal 2 of selector switch 120 by an electrical conductor 122, the other terminal of switch 113 is connected to terminal 3 of selector switch 120 through a conductor 123, the other terminal of switch 114 is connected to terminal 4 of selector switch 120 through a conductor 124 and the other terminal of switch 115 is connected to terminal 5 of selector switch 120 through a conductor 125.

That portion of the control circuit which is formed by switches 111 through 115, gear train 97, cam member 98 and motor 94 is available from the Hallock Company, Inc. in the form of a cam timer, Model TM5A604-EGLE.

In dispensing the amount of soap that is used in the hydraulic line, with selector switch 120 engaging terminal 1, the amount of soap delivered in the conduit is approximately 0.1 gallons per hour and when the switch is set at terminal 5, 0.8 gallons per hour are dispensed with the increments between being 0.175 gallons per hour increase.

Water is delivered at the rate of 15 gallons per minute when regulator 84 is set at 10 psi. In operation, it will be observed that motor 73 and pump 72 are controlled by the amount of cam switch "on time" which keeps switches 111 through 115 closed for increasingly longer periods of time and thus causes the pump to deliver intermittently more soap to be dispensed. Thus the solution which is used with the scrubbing brushes is intermittently applied and followed by rinse water to give a constant soap-water scrubbing effect to the shackles. In addition, it has been found to be beneficial to reverse motor 55 and permit brushes 50 and 51 to rotate in the same direction as brushes 40 and 41 to get at the lower or under surfaces of the shackles.

When selector switch 120 is set to the PRIME position, another contact 126 is engaged causing pump 72 to operate constantly and thus fill the conduit 71 and 75 with soap when the pump is being primed. It will be further observed that when selector switch 120 is in the OFF position, motor 73 is no longer operated and there is no soap then being delivered to either of output conduits 76 or 85.

The controls for the shackle scrubber are seen on the console of the machine as seen in FIG. 1.

OPERATION

When the machine is used, it is moved into place underneath the shackles 12 which are carried by conveyor 11. Crank 17 is turned until the platform 21 and the bifurcated frame 20 are moved vertically into place to engage the shackles between brushes 40, 41, 50 and 51. Since some of the shackles are extremely lengthy in vertical height, the bifurcated frame 20 may be set at an angle with respect to platform 21 by adjustment of arms 34 and 35. With the brushes turning and overlapping as explained earlier, the scrubbing and polishing action is started by engaging switch 57 which starts motors 56 and 55 turning. With water connected to conduit 81 and soap in container 70, the operator selects the proper position of selector valve 120 to provide the proper proportion of soap to rinse water and switch 95 is closed to start motor 74 which drives the cams. Upon proper selection of the amount of soap to be used through selector switch 120, actuation of switches 111 through 115 produces the proper timed sequence for operating motor 73 and thus discharging a proper amount of soap into conduit 75 and thus into outlet conduit 76. Shackle guide members 24 and 25 help align the shackles so that they engage the brushes in a proper manner to guide them into the machine when they first encounter the brushes.

If it is determined that certain portions of the undersurfaces of the shackles are left unpolished and uncleaned, actuation of reversing switch 58 causes brushes 50 and 51 to turn in the same direction as brushes 40 and 41 and through the weight of the shackle, the shackle is maintained in position and is scrubbed across the bottom portions thereof.

It has been found that through the use of the abrasive material in the brush bristles, the shackles are polished each time to a smoother surface than the previous operation and the smoother the shackles become, the cleaner they remain. The swirling action of the powered brushes drives the chemical in and around the elements of the shackles and the bottoms and crevices of the shackles are scrubbed and cleaned in the crevices which are impossible to reach in the hand scrubbing.

It will thus be seen that the present invention provides a mechanism for not only cleaning but scrubbing the shackles which are used in slaughterhouses to keep them in excellent sanitary condition.

It will, of course, be understood that various changes may be made in the form, details, arrangement and proportions of the parts without departing from the scope of the invention which consists of the matter shown and described herein and set forth in the appended claims.

What is claimed is:

1. A scrubbing mechanism constructed and arranged for use with an overhead poultry or animal shackle conveying mechanism for continuously moving the shackles, said scrubbing mechanism comprising:
  a. a vertical hoisting mechanism having a base member for supporting the same and having a platform extending therefrom operable to a selectable vertical position;
  b. an elongated bifurcated frame secured to said hoisting mechanism platform at a predetermined incline with respect thereto, said bifurcated frame having a pair of elongated members spatially disposed from each other;
  c. first rotary brush means with abrasive bristles having its axis of rotation extending substantially parallel to one of said pair of elongated members;
  d. second rotary brush means with abrasive bristles substantially parallel to said first rotary brush means, said first and second rotary brush means rotating in opposite directions and disposed with respect to each other for a downward pulling engagement of at least one of such overhead shackles therebetween;
  e. first and second guide bar means disposed beneath, and cooperating with, said first and second rotary brush means for aiding the movement of such shackles;
  f. a plurality of output conduits disposed adjacent at least one of said first and second rotary brush means;
  g. a plurality of liquids;
  h. a liquid dispensing mechanism connected between said plurality of liquids and said plurality of output conduits;
  i. and a control mechanism operably connected to said liquid dispensing mechanism for controlling the selection of said plurality of liquids and intermittently controlling the quantity of each of said plurality of liquids dispensed through said plurality of output conduits.

2. The structure as set forth in claim 1 including:
j. a pivot mechanism pivotally securing said elongated bifurcated frame to said hoisting mechanism platform;
k. and supporting arms releasably secured between said bifurcated frame and said hoisting mechanism platform to determine the angle of incline of said bifurcated frame.

3. The structure as set forth in claim 1 including:
l. shackle guide members secured to said bifurcated frame ends which first encounter such shackles, said guide members guiding such shackles between said first and second rotary brush means.

4. The structure as set forth in claim 1 including:
m. reversing means connected to at least one of said first and secone rotary brush means for reversing the direction of rotation of one of said brush means and providing a scrubbing action on the under surfaces of such shackles.

5. The structure as set forth in claim 1 including:
m. wheels secured to said base member of said hoisting mechanism to align said bifurcated frame to straddle such shackles carried by the conveying mechanism.

6. The structure as set forth in claim 1 wherein said control mechanism includes, motor means rotatably driving a plurality of cam members, each of which has a predetermined number of lugs of distinct frontal lobe area,
cam which means operably connected to said plurality of cam members and actuated thereby over distinct time periods.
and selector switch means operably connected between said cam switch means and said liquid dispensing mechanism for controlling the time of operation of the same in relation to said frontal lobe areas of said cam members.

7. The structure as set forth in claim 6 wherein said liquid dispensing means includes a motor driven pump mechanism intermittently dispensing one of said plurality of liquids.

8. The structure as set forth in claim 1 wherein said bifurcated frame overlies said platform, the two being formed in U-shaped cross section permitting such shackles to pass therebetween.

9. The structure as set forth in claim 1 where said first and second rotary brush means include bearing members supporting their axis spatially from each other less than the diameters of said brush means.

10. The structure as set forth in claim 9 wherein said bearing members are secured in the ends of said bifurcated frame and transversely movable towards and away from each other for determining the relative spacing between said first and second rotary brush means.

* * * * *